D. M. Holmes,
Cracker Machine
N° 81,505.   Patented Aug. 25, 1868

UNITED STATES PATENT OFFICE.

DANIEL M. HOLMES, OF WILLIAMSBURG, NEW YORK.

IMPROVED MACHINE FOR MAKING GINGER-SNAPS, &c.

Specification forming part of Letters Patent No. 81,505, dated August 25, 1868.

*To all whom it may concern:*

Be it known that I, DANIEL M. HOLMES, of Williamsburg, in the county of Kings and State of New York, have invented a new and useful Improvement in Machine for Making Ginger-Snaps, &c.; and I do hereby declare that the following is a full, clear, and exact description thereof, which will enable others skilled in the art to make and use the same, reference being had to the accompanying drawings, forming a part of this specification.

Figure 1:
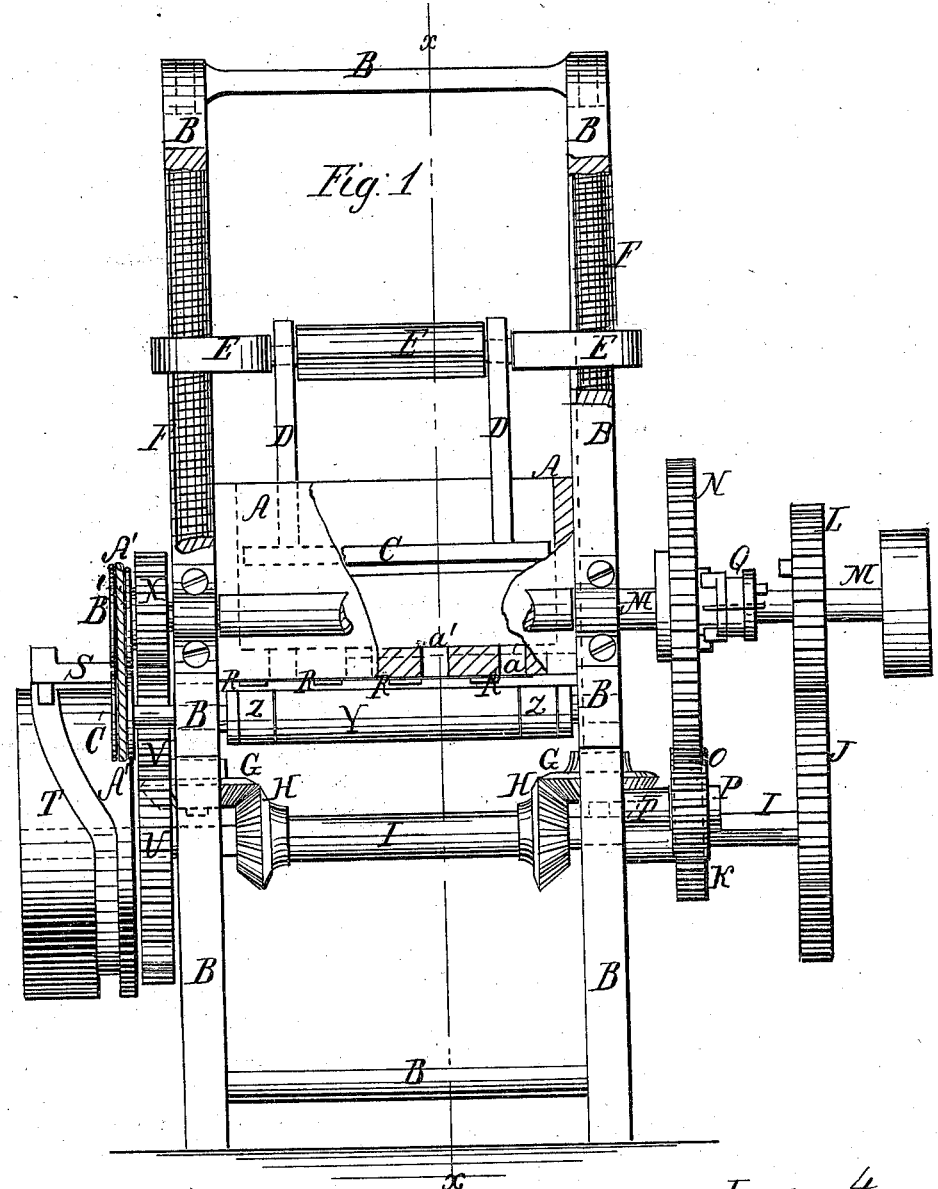
Figure 2:
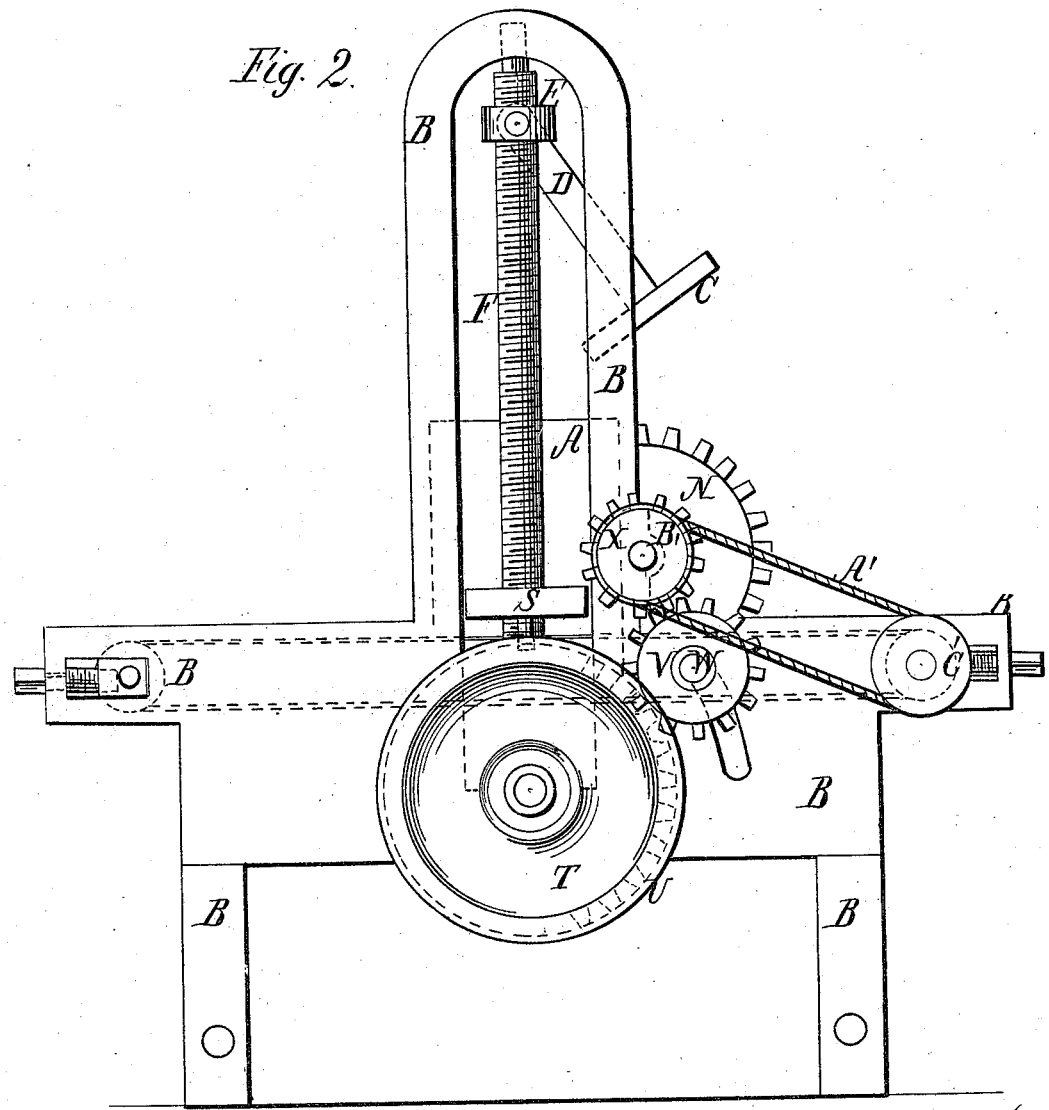
Figure 3:
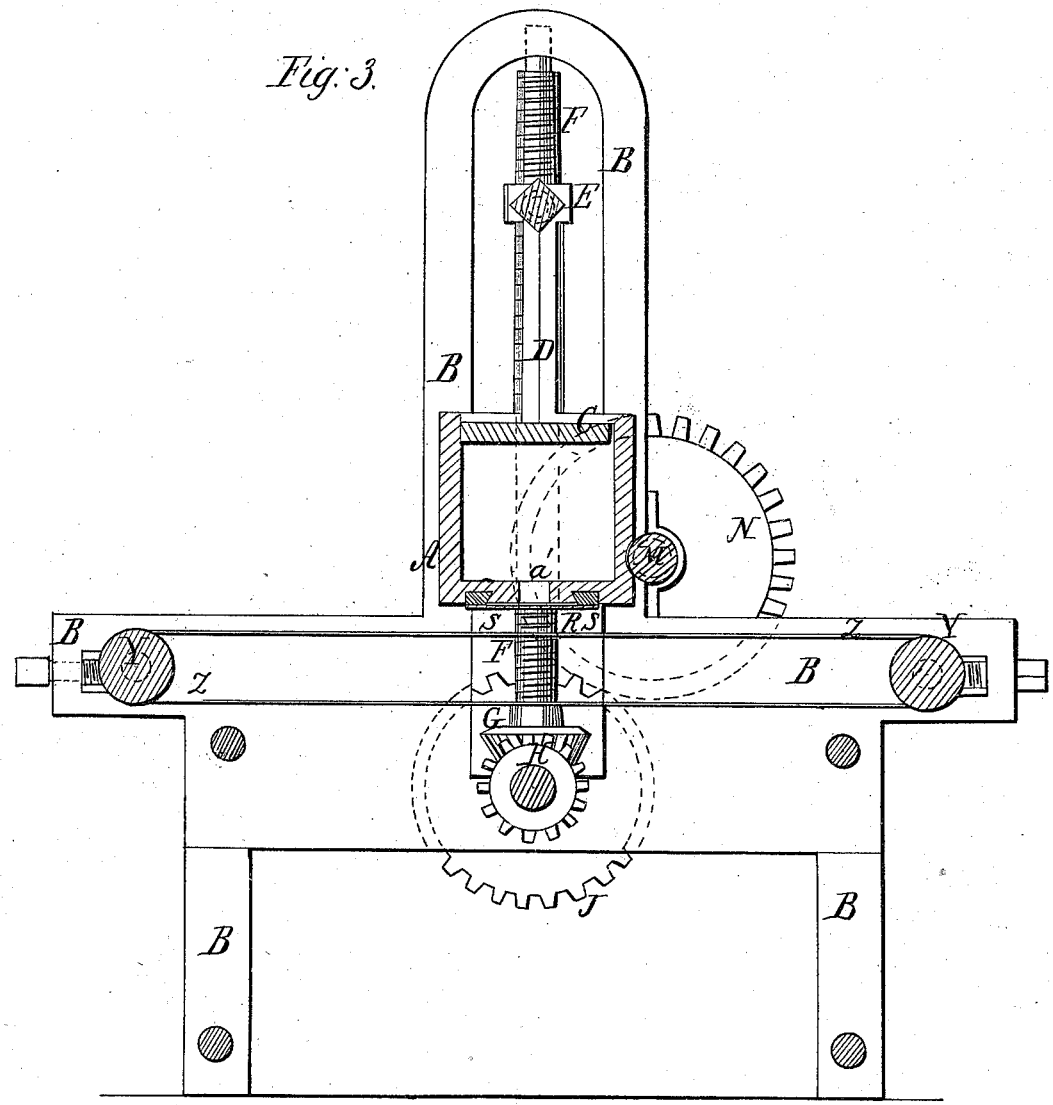

Figure 1, Sheet 1, is an end view of my improved machine, parts being broken away to show the construction. Fig. 2, Sheet 2, is a side view of the same. Fig. 3, is a vertical detail sectional view of the same, taken through the line $x\,x$, Fig. 1.

Similar letters of reference indicate corresponding parts.

My invention has for its object to furnish a simple, convenient, and effective machine by means of which ginger and other snaps may be made from soft dough rapidly, conveniently, and accurately; and it consists in the construction and combination of the various parts of the machine, as hereinafter more fully described.

A is the box in which the dough is placed, and which is securely attached to the frame B of the machine.

The dough-box A has openings $a$ formed in its bottom, through which the dough is pressed by the action of the follower C, which fits into the dough-box A, and is securely attached to the lower ends of the bars D, the upper ends of which are pivoted to the cross-bar E, so that the follower C, when raised out of the box A, may be conveniently swung to one side to allow free access to the interior of said box A.

In the ends of the cross-bar E are formed holes, having screw-threads cut in them, through which pass the screws F, so that the follower C may be raised and lowered by turning the said screws F.

The lower and upper ends of the screws F work in sockets or bearings attached to the frame B. To the lower parts of the screws F are attached, or upon them are formed, bevel-gear wheels G, into the teeth of which mesh the teeth of the bevel-gear wheels H, attached to the shaft I, which revolves in bearings attached to the frame B, and to one end of which is attached a large gear-wheel, J, for lowering the follower C with a slow movement to press out the dough, and a small gear-wheel, K, to enable the said follower C to be raised with a more rapid movement.

L is a small gear-wheel, the teeth of which mesh into the teeth of the gear-wheel J, and which runs loosely upon the shaft M, which works in bearings in the frame B, and to which motion may be given by hand or other convenient power.

N is a large gear-wheel, also running loosely upon the shaft M, and which is connected with the gear-wheel K by the gear-wheel O, running loosely upon the journal P, attached to the frame B, and the teeth of which mesh into the teeth of both the gear-wheels N and K, so that the shaft I may be revolved in either direction, to raise or lower the follower C from the shaft M, without changing the revolution of said shaft M.

Q is a clutch sliding upon the shaft M between the wheels L and N, and which may be thrown into gear with either of said wheels, causing it to revolve with the said shaft M according to the direction in which it is desired to move the follower C.

R are knives, the ends of which are attached to the knife-frame S, and which slide back and forth beneath the bottom of the dough-box A, to cut off the dough as it is forced out through the holes $a'$. The knife-frame S slides back and forth in dovetailed or channeled grooves in the bottom of said box, as shown in Fig 3.

To the projecting end of the knife-frame S is attached a pin, which enters a groove in the cam-wheel T, so that the knife-frame S may be moved back and forth by the revolution of the said cam-wheel T.

The cam-wheel T runs loosely upon the end of the shaft I, or upon a journal attached to the frame B, and to its inner side is attached a gear-wheel, U, into the teeth of which mesh the teeth of the gear-wheel V, which runs loosely upon the journal W, attached to the frame B.

X is a gear-wheel attached to the end of shaft M, and the teeth of which mesh into the teeth of the gear-wheel V, so that the cam-wheel V may receive motion from the said shaft M.

The gear-wheel X is made detachable, so that it may be detached and replaced with a smaller or larger one, according as it is desired to vibrate the knife-frame S faster or slower. To enable this to be done, the journal W should be placed in a curved slot in the frame B, so that its position may be adjusted as required, to enable the gear-wheel V to mesh into the gear-wheels U and X, whatever sized gear-wheel X may be used.

The groove in the cam-wheel T, in which the guide-pin of the knife-frame S works, should be straight, with two or more sharp inclines, so that the knives R may be operated quickly at the proper time, and may remain stationary at other times.

Y are rollers, the journals of which should revolve in adjustable bearings in the frame B. Z are endless belts passing around the rollers Y, and to which should be attached or which form an endless apron, to receive and carry the pans that receive the snaps from the machine. Motion is communicated to the carrier by the band A', that passes around the pulley B', attached to the shaft M, and around the pulley C', attached to one of the rollers Y.

In using the machine, the follower C is run up and the dough is placed in the dough-box A; then, as the follower C slowly descends, the dough is forced out through the holes $a'$ in the bottom of said box A, and at the proper time to form snaps of the desired size the protruding dough is cut off in slices or cakes, by the forward and backward movement of the knives R. The snaps, as they are cut off, drop into pans placed upon the carrier Y Z, which pans, as they are carried forward, are removed by the attendant.

Having thus described my invention, what I claim as new, and desire to secure by Letters Patent, is—

1. The combination of the follower C, cross-bar E, and screws F with the dough-box A, frame B, and driving-shaft I, substantially as herein shown and described, and for the purpose set forth.

2. The knife-frame S, adapted to slide in dovetail grooves formed in the bottom of the dough-box A, upon each side the perforations, whereby the knives R are adapted to be fastened upon the under side of said frame and work in contact with the perforations, as herein described, for the purpose specified.

3. Operating the sliding knife-frame S from the shaft M by means of the cam-wheel T and gear-wheels V and X, substantially as herein shown and described, and for the purpose set forth.

4. The combination and arrangement of the gear-wheels L J N O K and sliding clutch Q with each other, and with the shafts M and I, for the purpose of operating the follower C, substantially as herein shown and described.

The above specification of my invention signed by me this 25th day of July, 1868.

DANIEL M. HOLMES.

Witnesses:
  FRANK BLOCKLEY,
  JAMES T. GRAHAM.